United States Patent
Pineau et al.

(10) Patent No.: US 10,850,374 B2
(45) Date of Patent: Dec. 1, 2020

(54) SYSTEM FOR CONTROLLING A PORTABLE TOOL WITH AUTONOMOUS ENERGY SOURCE, CORRESPONDING PORTABLE TOOL, MODULE AND CONTROL METHOD

(71) Applicant: Etablissements Georges Renault, Saint Herblain (FR)

(72) Inventors: Laurent Pineau, Nantes (FR); Ghislain Francois, Saint Nazaire (FR); Gatien Butstraen, Nantes (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 0 days.

(21) Appl. No.: 15/999,134

(22) Filed: Aug. 17, 2018

(65) Prior Publication Data

US 2019/0056507 A1    Feb. 21, 2019

(30) Foreign Application Priority Data

Aug. 17, 2017   (FR) ..................................... 17 57725

(51) Int. Cl.
*B25B 23/14*       (2006.01)
*H04W 4/021*     (2018.01)
(Continued)

(52) U.S. Cl.
CPC .............. *B25B 23/14* (2013.01); *B25B 21/00* (2013.01); *G01S 19/07* (2013.01);
(Continued)

(58) Field of Classification Search
None
See application file for complete search history.

(56) References Cited

U.S. PATENT DOCUMENTS

| 5,910,894 A | * | 6/1999 | Pryor | ............... | G05B 19/41875 |
| | | | | | 219/121.64 |
| 6,845,279 B1 | | 1/2005 | Gilmore et al. | | |

(Continued)

FOREIGN PATENT DOCUMENTS

FR         3010927 A1      3/2015

OTHER PUBLICATIONS

Laurent et al., System for controlling an industrial tool by defining its volume of use by learning (Machine Translation), FR3010927 (A1), 2015 (Year: 2015).*

(Continued)

*Primary Examiner* — Carlos Garcia
(74) *Attorney, Agent, or Firm* — David D. Brush; Westman, Champlin & Koehler, P.A.

(57) ABSTRACT

A system for controlling a portable tool with autonomous energy source, implementing at least one geo-positioning beacon external to the tool and capable of communicating with the portable tool. The system includes the following elements carried by the portable tool: a receiver, in or on the portable tool, for receiving control information delivered by the at least one beacon; and a processing unit, which determines the presence of the portable tool within or outside at least one pre-determined space, from the control information, communicates with a controller capable of managing the behavior of the tool as a function of the presence of the portable tool within or outside the pre-determined space or spaces and at least one pre-determined production rule.

19 Claims, 3 Drawing Sheets

(51) Int. Cl.
*H04W 4/02* (2018.01)
*B25B 21/00* (2006.01)
*G01S 19/07* (2010.01)
*G05B 19/4061* (2006.01)
*G05B 19/418* (2006.01)

(52) U.S. Cl.
CPC ..... *G05B 19/4061* (2013.01); *G05B 19/4185* (2013.01); *H04W 4/02* (2013.01); *H04W 4/021* (2013.01); *G05B 2219/23406* (2013.01)

(56) References Cited

U.S. PATENT DOCUMENTS

| | | | |
|---|---|---|---|
| 7,055,233 B1 | 6/2006 | Hofer et al. | |
| 7,272,456 B2 * | 9/2007 | Farchmin | G05B 19/122 |
| | | | 455/456.1 |
| 8,676,368 B2 * | 3/2014 | Stencel | B25B 21/00 |
| | | | 377/17 |
| 9,467,862 B2 * | 10/2016 | Zeiler | H04W 4/021 |
| 10,078,322 B2 * | 9/2018 | Khalaf | B25B 23/147 |
| 2010/0057243 A1 * | 3/2010 | Stencel | G05B 19/41805 |
| | | | 700/117 |
| 2010/0138094 A1 * | 6/2010 | Stark | G07C 5/0891 |
| | | | 701/23 |
| 2012/0315927 A1 * | 12/2012 | Du | H04W 4/029 |
| | | | 455/456.3 |
| 2014/0240125 A1 * | 8/2014 | Burch | G08B 21/0213 |
| | | | 340/539.13 |
| 2017/0160030 A1 | 6/2017 | Goren et al. | |

OTHER PUBLICATIONS

French Written Opinion dated Nov. 30, 2017 for corresponding French Application No. 1757725, filed Aug. 17, 2017.
French Search Report dated Nov. 30, 2017 for corresponding French Application No. 1757725, filed Aug. 17, 2017.
Machine translation of the Communication from the Examining Division dated Sep. 23, 2020 for corresponding EP Application No. 18189428.8.

* cited by examiner

Figure 3

SYSTEM FOR CONTROLLING A PORTABLE TOOL WITH AUTONOMOUS ENERGY SOURCE, CORRESPONDING PORTABLE TOOL, MODULE AND CONTROL METHOD

1 CROSS-REFERENCE TO RELATED APPLICATIONS

This Application claims priority to French Application No. FR 1757725, filed Aug. 17, 2017, the content of which is incorporated herein by reference in its entirety.

2 TECHNICAL FIELD

The field of the invention is that of portable tools with autonomous energy source, for example screwdriver tools used on assembly lines.

More specifically, the invention relates to the control of the operation of such a tool on the basis of control information and pre-determined production rules.

The invention has numerous applications, especially but not exclusively in the field of motor vehicle production where the configuration of the tools is specific to a given workstation on an assembly line. A system that enables the control of such a portable tool, for example to prevent it from being used at a wrong workstation, is thus of prime interest.

3 TECHNOLOGICAL BACKGROUND

The context of the invention is that of the use of industrial tools, especially autonomous (i.e. battery-powered) tools such as screwdriver tools in industrial-scale production.

For example, the automotive or aeronautical industries use advanced screwdriver tools, for example capable of carrying out screw driving cycles that also integrate numerous steps that cause variations in screw driving parameters such as:

- the rotation speed (which differs from a pre-screw-driving phase to a screw driving phase);
- the tightening strategy: determining the torque, angle, elastic limit depending on the application;
- the sequencing of the screw driving operation, for example having an automatic feedback link between a report on a screw driving operation and the accurate performance of several screw driving operations corresponding to several assembling points on one and the same workpiece.

Besides, such screw driving cycles can differ depending on the workpieces to be processed and/or the work zone. It is therefore desirable to control the tools, especially according to the space in which they are situated.

In addition, the working of such tools is automatically linked or enslaved to the commands of an assembly line control system. Such a system can be an industrial automaton. This automaton can manage:

- the forward movement on the assembly line;
- the activation or deactivation of the different production tools depending on the products or vehicle arriving at each workstation;
- the recording of the production timeline, including the screw driving results for each product or vehicle passing onto a workstation.

Historically, the screw driving tools used in industrial production have been connected to a by a cable to a fixed controller. This controller integrates the electrical power supply of the tool as well as the controller for this tool. These controller are used to activate or deactivate the tool according to a screw driving strategy adapted to the workstation or again they are used to retrieve the results of the screw driving operation.

This controller itself receives operating instructions from the production control system to which it is connected by wiring. As a result, since the tool is connected by a cable to the controller, it is guaranteed that a given tool has been used at the right workstation (here, the term workstation is understood to mean a work space authorized for the tool in question).

However, the use of tools with autonomous energy sources (for example batteries) is widespread in the sector of industrial-scale production because of the comfort and ergonomy that it brings.

The functions of the tools, for example battery-operated screwdrivers, however remain the same. Thus, these screwdrivers remain linked by radio to an external fixed controller or to a point of communications with the production control system.

This radio link can for example be a WiFi link. In this case, the controller no longer incorporates the power supply of the tool but integrates means for controlling this tool and communications. The fixed controller remains connected by wire to the production control system.

These new tools with autonomous energy sources however have one major drawback: the absence of cables means that an operator is no longer prevented from moving his tool to a workstation other than the one for which it was intended and for which it was given its settings.

The negative consequences are especially the following, for example for a screwdriver intended for a specific action on a specific vehicle:

- the screw driving strategy may be unsuited to use on a vehicle other than the one present at the workstation; and
- the tightening results which are exported after a tightening operation made outside the workstation will be associated with a vehicle that was present at the workstation, hence with a vehicle that was not the one that supported the tightening operation.

These consequences are inacceptable in the context of motor vehicle production, and this results in the parallel development of locating means applied to such tools in industry.

Similar drawbacks are encountered with other types of autonomous tools, for example drilling tools and/or in other industrial applications.

Various tool-locating technologies have been tested with the purpose of making the operation of such tools automatically linked to (or dependent upon) their presence in a geographic zone corresponding to that of the workstation.

The following technologies can be cited:

- location or positioning by ultrasound transceiver;
- location by infrared transceiver; and
- location by radio means, especially of the UWB (Ultra-Wideband) type.

UWB type radio means are currently considered to be the ones those most suited to an industrial environment. These means rely on a radio modulation technique based on the transmission of very short pulses. The shortness of these pulses minimizes errors of measurement of propagation time between the transmitter and the receiver and makes these radio means particularly suited to the measurement of distance. The frequencies used are situated in a 3-10 GHz band. Their use implies the installation of fixed beacons on the perimeter of the workstation. These beacons integrate a UWB transceiver capable of communicating with a tag embedded in the tool, which itself incorporates a UWB transceiver.

On the basis of the flight time or transit time taken by the UWB signals to travel between beacons and tags, the controller associated with the beacons are capable of computing the distance between each beacon and the tag and then, by trilateration, computing the coordinates of the location of the tag in a reference system related to the beacons and therefore to the workstation. It is thus possible to have real-time knowledge of the location of the tool, ascertain its presence in the work zone and then permit or not permit its operation depending on whether or not it is located in the work zone.

There are various strategies possible that bring greater reliability to the determining of flight time as a function of hardware or installation constraints. These strategies are called TOA (Time of Arrival), TDOA (Time Difference of Arrival) and TWR (Time Weighted Return) and are known to those skilled in the art.

The work zone is defined in the controller for example by coordinates of points forming the corners of the work zone, the boundaries of this zone being formed by the lines between these corners. The patent FR3010927FR for example describes a method for facilitating the establishment of the work zone by placing the tool at the location of these corners and activating the measurement and recording of their coordinates in using means to give commands to the tool after having activated a learning means in the controller.

The existing locating systems however have certain drawbacks.

For example, the location of the tool is computed at the position of one of the beacons, called a "master" beacon and the information on the position of the tool is communicated to the controller which allows or does not allow the tool to function.

This approach provides for determining the position and the sending of commands by a controller which may or may not authorize the working of the tool, is for example proposed in the documents FR3010927A1 or U.S. Pat. No. 7,055,233B1.

Now, in certain applications, there is no fixed controller but a simple WiFi access point enabling radio communications between the tool and the production control system.

In other cases, the control station is simplified and the tool operates independently without a controller. Despite this autonomy, there may be a need to control the position of the tool.

In these circumstances, it is not possible to connect the "master" beacon to a device capable of controlling the tool, and this is a handicap for this type of positioning or position-locating system.

The need to link the "master" beacon to a controller can be a drawback if the beacon is not at the same place as the controller. This calls for the use of wiring that is sometimes complicated to implement.

There is thus a need for a system enabling simplified and efficient control of a portable tool with an autonomous energy source, that does not have at least some of these drawbacks of the prior art.

4 SUMMARY

An exemplary embodiment of the invention thus proposes a system for controlling a portable tool with autonomous energy source, the system implementing at least one geo-positioning beacon external to the tool and capable of communicating with the portable tool. Such a system comprises receiver, in or on said portable tool, for receiving control information delivered by said at least one beacon and a processing unit for determining the presence of said portable tool within or outside at least one pre-determined space, from said control information, communicating with a controller capable of managing the behavior of said tool as a function of the presence of said portable tool within or outside said pre-determined space or spaces and at least one pre-determined production rule, said receiver, processing unit and controller being carried by said portable tool.

Thus, an exemplary embodiment of the invention proposes a novel and inventive approach to enabling the control of a portable tool with autonomous energy source. Indeed, it is the tool itself that manages its own behavior as a function of the control information received, and not a remote server that would transmit operating instructions or commands.

In such a system, the portable tool therefore comprises a receiver for receiving control information delivered by the at least one beacon, a processing unit for determining, by itself, its position within or outside a pre-determined space and a controller capable of managing the behavior of the tool as a function of control information and at least one pre-determined production rule.

Thus, an exemplary embodiment of the invention proposes a novel and inventive solution that runs counter to the pre-conceived ideas of those skilled in the art, enabling especially the control of a portable tool with an autonomous energy source by itself, and not through a server or a controller sending it commands. Indeed, it is the tool itself that manages its own behavior as a function of the control information received and not a remote server transmitting operating instructions or commands.

This makes it possible for example in the event of a break in the link between the tool and a centralized controller, for the tool to 'self-deactivate'. An exemplary embodiment of the can be applied indeed to autonomous tools, i.e. tools working without any linking cable. This type of tool offers freedom of movement but makes the approach of an embodiment of the invention particularly efficient, offering autonomous control even in the case of a wireless connection (for example a WiFi link) problem.

In one embodiment, the control information comprises geo-positioning information.

More particularly, the tool receives signals from one or more beacons which, depending on the embodiments, can carry data for locating the tool or information enabling the tool to determine this position.

Thus, geo-positioning information (for example raw information coming from physical signals used by the geo-positioning beacon to locate the tool) can be transmitted to the tool so that it can by itself determine its position (for example positional coordinates, a distance to the geo-positioning beacon) on the basis of which its behavior will be deduced.

According to another approach, the beacon or one of the beacons determines the position of the tool and sends it the corresponding information.

In one embodiment, the geo-positioning information includes data representing the location of the tool.

Thus, the data representing the location of the tool (for example positional coordinates, an angle and/or distance to the geo-positioning beacon) are determined by the geo-positioning beacon. This beacon then transmits the data in question to the tool, thereby minimizing the computation load in the tool.

In one embodiment, the pre-determined rule or rules belong to the group comprising the following rules:
- permitting the operation of the portable tool and/or one of its accessories if the tool is situated in at least one pre-determined space;
- preventing the operation of the tool and/or one of its accessories if the tool is not situated in at least one pre-determined space.

Thus, the tool is not allowed to function unless it is situated in a pre-determined work space. Several spaces can be defined, if necessary with distinct associated operations.

In different particular embodiments, the receiver for receiving control information communicates with the controller in the portable tool according to one of the techniques belonging to the group comprising:
- SPI links;
- I2C links;
- USB links;
- asynchronous serial links;
- digital inputs/outputs;
- radio.

In one embodiment, the at least one geo-positioning beacon communicates with the receiver of the portable tool in implementing Ultra-Wide Band radio communications on a frequency band ranging from 3 to 10 GHz.

In one embodiment, the portable tool comprises a processing unit for determining the presence of the portable tool within or outside at least one pre-determined space comprising:
- computing or obtaining data representing the location of the tool from geo-positioning information received by the receiver;
- identifying the position of the tool within or outside the boundaries of the at least one pre-determined space, as a function of the data representing the location of the tool.

Thus, the tool is capable by itself of determining whether it is situated in a permitted space, for example in a right working space.

In different embodiments, the data representing the location of the tool belong to the group comprising:
- at least one distance between the portable tool and at least one beacon;
- coordinates of the portable tool in a fixed reference system, obtained by a computation of trilateration on the basis of distances between the portable tool and at least two beacons. Two beacons can be enough to carry out an approximate computation of location when the tool is used by the operator at a height that varies little;
- polar coordinates of the portable tool relative to the fixed reference point of a beacon;
- polar coordinates of at least two beacons relative to the reference point of the tool.

In different embodiments, the boundaries of the at least one pre-determined space are defined by data representing boundaries belonging to the group comprising:
- pre-determined point coordinates corresponding to the corners of the boundaries;
- theoretical straight-line or curved-line junctions passing through the corners;
- at least one pre-determined borderline distance relative to the at least one pre-determined beacon.

In one embodiment, the portable tool integrates a memory in which data defining the boundaries are recorded.

Thus, the tool can permanently or periodically, and independently, verify that its position is in compliance with the authorized zone corresponding to the data recorded the memory.

In one embodiment, the tool can be used in at least two modes:
- a learning mode in which at least one pre-determined space is defined; and
- a working mode in which the controller controls the tool as a function of its geo-positioning relative to the pre-determined space or spaces.

Thus, the pre-determined space representing the workstation in which the tool will be authorized to work is defined directly by the operator through the selection of a learning mode, for example in a man/machine interface of the tool.

In one embodiment, at least certain of the signals exchanged between at least one of the beacons and the receiver of the portable tool relate to:
- complementary data; and/or
- commands for activating a pre-determined operation strategy and/or deactivating the tool and/or one of its accessories.

Thus, the use of the capacity of the radio transmission channel between the beacon or beacons of the control system and the tool is optimized.

The invention, in another embodiment, proposes a portable tool comprising a receiver for receiving control information delivered by at least one fixed geo-positioning beacon, a processing unit for determining the presence of said portable tool within or outside at least one pre-determined space, on the basis of said control information communicating with a controller capable of managing the behavior of said tool as a function of the presence of said portable tool within or outside said pre-determined spaces and at least one pre-determined production rule.

In one embodiment, the portable tool comprises a processing unit for determining the presence of the portable tool within or outside the at least one pre-determined space on the basis of control information.

In one embodiment, the control information comprises information for geo-positioning, the processing unit:
- computing or obtaining data representing the location of the tool on the basis of the geo-positioning information-location received by the receiver;
- identifying the position of the tool within or outside the boundaries of said at least one pre-determined space as a function of the data representing the location of the tool.

In one embodiment, the tool comprises a memory in which data defining said boundaries are recorded.

In one embodiment, the processing unit defines the at least one pre-determined space in a learning mode.

In one embodiment, the processing unit comprises a learning actuator enabling an indication of the presence of the tool in a corner of at least one pre-determined space and/or a distance from at least one beacon. This learning actuator can be a means of command (the trigger) for the tool.

In another embodiment, the invention proposes a module that is meant to be mounted on a portable tool in a system according to any one of the above-mentioned embodiments. Such a module comprises a memory storing at least one pre-determined production rule and/or data representing pre-determined boundaries characterizing said pre-determined space or spaces.

Thus, a tool not initially planned for supporting the control technique according to an embodiment of the invention can be upgraded for this purpose through the embedding of the module in question.

According to one embodiment, the module comprises a processing unit configured:
- for computing or obtaining data representing the location of the tool from geo-positioning information received by the receiver;
- for identifying the position of the tool within or outside the boundaries of the at least one pre-determined space as a function of the data representing the location of the tool.

In one embodiment, the tool comprises a learning actuator that makes it possible to indicate the presence of the tool in a corner and/or a boundary of the at least one pre-determined space and/or at a reference distance from at least one of the beacons. This learning actuator can be a button placed on the module. A means for selecting or deselecting the learning mode could consist of a particular action of pressing this button (a lengthy press or a sequence of several presses).

In another embodiment; the invention proposes a method for controlling a portable tool with autonomous energy source provided with a controller capable of managing the behavior of the tool, implementing at least one geo-positioning beacon external to the tool and capable of communicating with the portable tool. Such a method implements the following steps in the portable tool:
- receiving control information delivered by the at least one beacon;
- determining the presence of said portable tool within or outside said at least one pre-determined space on the basis of said control information;
- managing, by the controller, of the behavior of the tool as a function of the control information or at least one pre-determined production rule.

Thus, a portable tool with an autonomous energy source that does not include an internal controller can be controlled on the basis of control information provided by the geo-positioning beacon.

In one embodiment, the method comprises a step for determining the presence of the portable tool within or outside the at least one pre-determined space on the basis of control information.

Thus, the tool is allowed to function only when it is at the right workstation.

In one embodiment, the control information comprises geo-positioning information and the step for determining comprises:
- a step for computing or obtaining data representing the location of the tool on the basis of the geo-positioning information received by the receiver;
- a step for identifying the position of the tool within or outside the boundaries of the at least one pre-determined space as a function of data representing the location of the tool.

Thus, the tool itself determines that it is situated in an authorized zone, i.e. at the right workstation.

In one embodiment, the method implements, in the tool, in a learning mode, a step for defining the at least one pre-determined work space.

Thus, the pre-determined space representing the workstation in which the tool will be permitted to work is defined directly by the operator through the implementing of a learning mode in the tool.

In one embodiment, the defining step implements a storage of data representing the boundaries of the at least one pre-determined work space and/or a borderline distance relative to a pre-determined beacon by activation of a learning actuator.

Thus, the tool can permanently and autonomously verify the compliance of its position with the authorized zone corresponding to the data stored in the memory.

In one embodiment, the method comprises a step for receiving complementary data in the tool and/or step for transmitting complementary data from the tool to a server via signals exchanged with the beacons.

Thus, the use of the capacity of the radio transmission channel between the beacon or beacons of the control system and the tool is optimized.

5 LIST OF FIGURES

Other features and advantages of one or more embodiments of the invention shall appear from following description, given by way of an indicative and non-exhaustive example, and from the appended figures of which.

6 DETAILED DESCRIPTION OF THE INVENTION

In all the figures of the present document, the identical elements and steps are designated by a same reference.

The general principle of an embodiment of the invention described is based on the control of a portable tool with autonomous energy source, the control being carried out by this tool itself.

Such a system implements especially at least one geo-location beacon external to the tool, capable of communicating with the tool in question. More particularly, the portable tool comprises means (a receiver) for receiving control information delivered by one or more beacons and control means (a controller) capable of managing the behavior of the tool as a function of control information and at least one pre-determined production rule.

Thus, the direct transmission by the geo-location beacon of control information to the tool and the use of this information by the controller of the tool make it possible to do away with the use of an external controller to transmit instructions to the tool, as is done in the prior art.

As described in the example below, an embodiment of the invention especially enables the tool to control its operation by itself according its position, which it can determine itself or receive from one of the beacons depending on the embodiments.

Besides, it will be noted that portable tools with autonomous energy source that do not communicate with an external controller or with an assembly line control system can also be controlled on the basis of information given directly by the geo-positioning beacon.

Figure 1A:
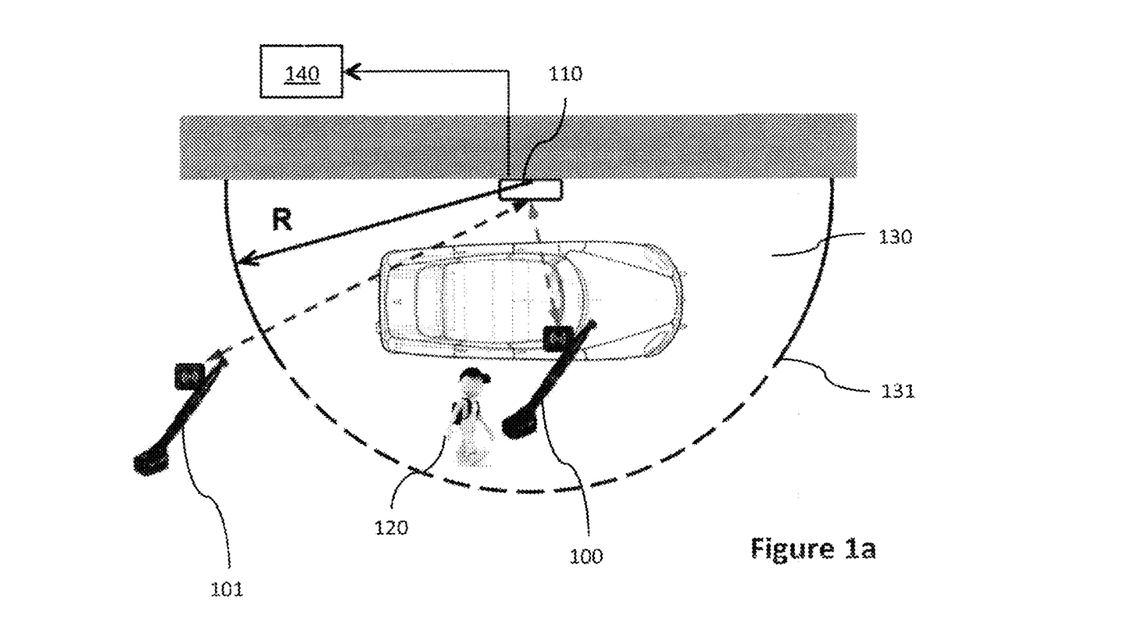
FIGS. 1a and 1b illustrate examples of a control system for a portable tool with autonomous energy source according to different embodiments of the invention.
Figure 1B:
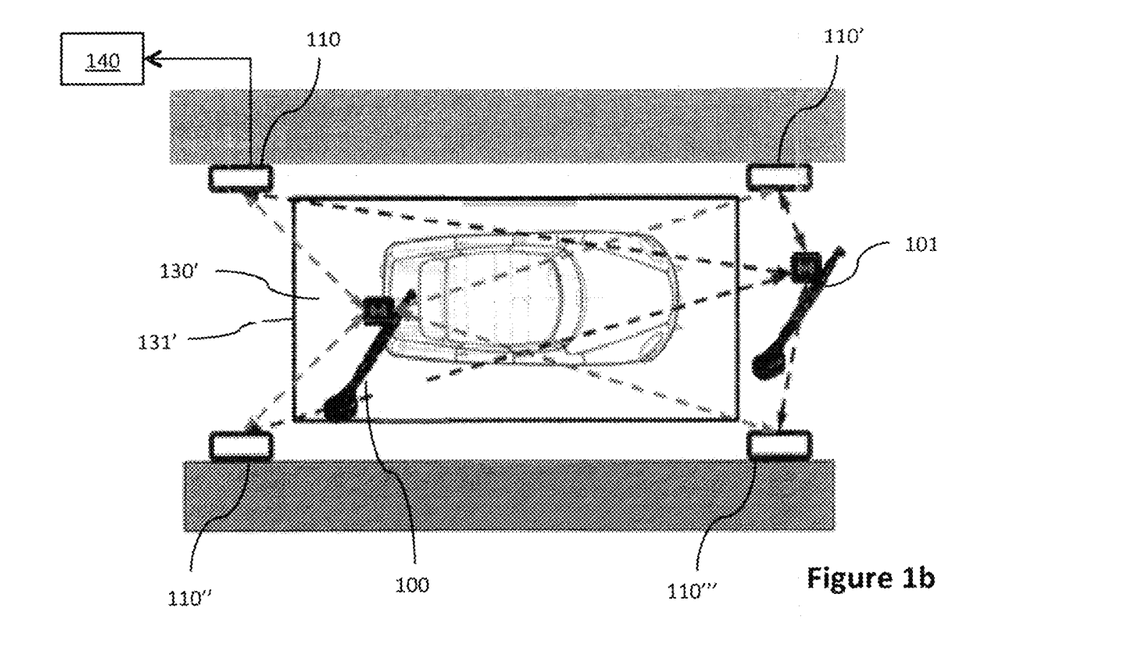
Figure 2:
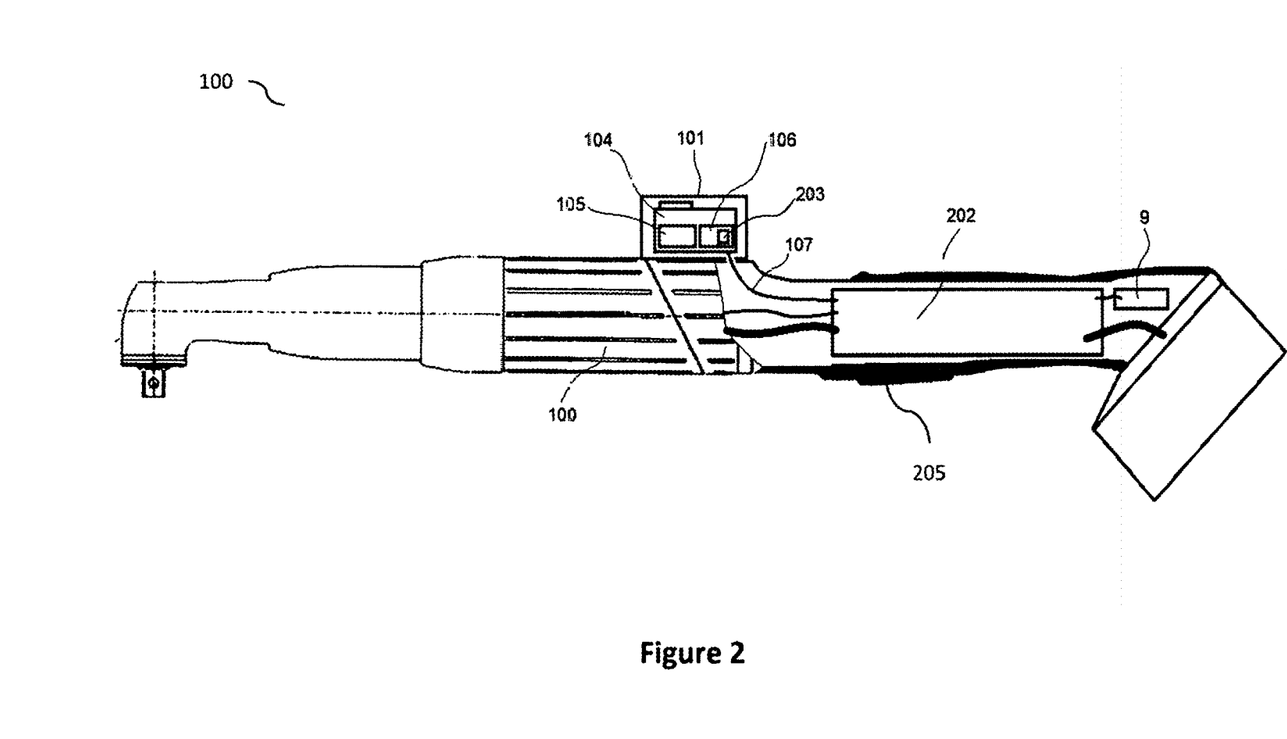
FIG. 2 shows a simplified example of a structure of a module mounted on the portable tool of FIG. 3.

Referring now to FIGS. 1a, 1b and 2, we shall describe examples of a control system for a portable tool 100 with autonomous energy source as well as the module 101 mounted on the portable tool 100 in question according to different embodiments of the invention.

An embodiment of the invention can be applied to numerous types of portable tools with autonomous energy sources, especially screwdrivers, drills etc.

Here below, we shall provide a more particular description of an electrical screwdriver 100 with automatically controlled or enslaved tightening. This screwdriver 100 is conventionally used, during its screw driving operation, to tighten an assembly, i.e. the connecting of several parts, for example by means of one or more screws tightened to a torque having a value chosen such that the assembly is efficiently rigid but at a maximum such that it does not damage said screw or screws. The target tightening torque value is therefore is an example of parameters of use of the tool 100. Other parameters of use can be defined such as the screw driving angle or the passage from the elastic phase of a screw to the plastic phase.

Such a tool 100 generally comprises a casing comprising a grip and containing especially the following elements:
- a synchronous motor provided with a rotor;
- a transmission integrating a reduction gear;
- a terminal element capable of carrying a screwdriver bit;
- a torque sensor designed to detect the attaining of a target torque value;
- an angle sensor whose purpose is to measure the angle between the rotor and stator of the motor;
- a controller for commanding the tool enabling an operator to use this tool, this controller being typically an electrical trigger;
- at least one battery constituting an electrical energy source; and
- a transceiver module 9 enabling two-way radio communications (WiFi network for example) with its controller 202 to receive especially the use parameters).

Besides, such a tool 100 also comprises:
controller 202 commanding the motor continuously and receiving information from the sensors on the operation in progress; and
a receiver and possibly a transmitter 104 enabling radio communications (in this case implementing a UWB radio link on a frequency band ranging from 3 to 10 GHz) with at least one geo-positioning beacon 110, 110', 110", 110''' external to the tool 100 to receive especially control information making it possible to define a behavior of the tool in taking account of at least one pre-determined rule of production.

Thus, in the embodiment illustrated, the system uses UWB type radiofrequency signals. The position of the tool is then determined by an assessment of the distance between the tool and the at least one beacon 110, 110', 110", 110''' of the system. Certain UWB beacons can also be used to determine the angle at which the tool is perceived by the beacon relative to its own referential system.

More particularly, the receiver 104 herein communicate with the controller 202 through an SPI link (Serial Peripheral Interface link). The receiver 104 are connected to the controller of the tool 202 by wire conductors or printed-circuit conductors, these conductors enabling the exchange of signals and the supply of electrical power to the module.

In the case of the installation of a module on a tool that does not originally have conductors to connect the module to the controller of the tool, the module can integrate a radio communications element capable of communicating with the radio communications device that the tool uses to communicate with the controller (WiFi, BlueTooth etc.).

In variants, other interfaces can be used to exchange data between the receiver 104 and the controller 202, for example an I2C link (Inter-Integrated Circuit link), a USB link (Universal Serial Bus link), a serial asynchronous link or more generally digital inputs/outputs.

In certain variants of the signaling used between the at least one geo-location beacon 110, 110', 110", 110''' location and the tool 100, the control information comprises geo-location information (for example raw information of the flight time type or the like, coming from the UWB signals used by the geo-location beacon to locate the tool. As a result the tool 100 is capable, by itself, of determining its position on the basis of geo-location information provided, and therefore deducing a behavior from this as a function of the position determined.

In this case, the receiver can integrate a processing unit for computing data representing the location 105 of the tool on the basis of the raw information.

In other variants of signaling, the information on geo-location directly comprises data representing the location of the tool 100 itself. As a result, the computation load is minimized in the tool 100.

In the embodiment illustrated in FIG. 1*a* (a single beacon 110), such pieces of data representing the location of the tool 100 are for example:
- at least one distance between the portable tool 100 and the beacon 110; and
- polar coordinates of said portable tool relative to the fixed reference point of a beacon 110 (for example when the beacon 110 in question comprises at least two antennas configured to enable a source separation and hence the determining of an angle).

Besides, in the embodiment represented in FIG. 1*b* in which the control system comprises four beacons 110, 110', 110", 110''' the data representing the location of the tool 100 can also be:
- the coordinates of the portable tool 100 in a fixed reference system obtained by a trilateration computation from the distances between the portable tool 100 and at least two of the four beacons 110, 110', 110", 110''';
- polar coordinates of at least two of the four beacons 110, 110', 110", 110''' relative to the reference point of the tool 100; and
- data representing distances between at least two beacons of the four beacons 110, 110', 110", 110''' and the tool 100.

Whatever the embodiment considered (FIG. 1*a* or 1*b*) and whatever the above-mentioned signaling variant considered, the pre-determined production rules used by the tool 100 can thus take account of the location of the tool. Such a rule is for example the following:
- authorize the operation of the portable tool 100 and/or one of its accessories, if the tool 100 is situated in a pre-determined space 130, 130' (representing the workstation authorized for the tool 100);
- prevent the working of a tool 100 and/or one of its accessories if the tool 101 in question is not situated in the pre-determined space 130, 130' in question;
- authorize a particular operation of the portable tool 100 and/or one of its accessories according to a pre-determined operating strategy, if the tool is situated in the pre-determined space 130, 130'.

Thus, the tool 100 is not authorized to function, whether or not in a particular way, unless it is situated in an authorized zone, i.e. at a right workstation in practice.

This authorized zone, or pre-determined space, can especially be defined in two dimensions (ground surface area) and can represent all or a portion of a circle with a radius R (FIG. 1*a*), an ellipse, a rectangle (FIG. 1*b*), a combination of these surfaces or more generally any suitable form defined by rectilinear, curved boundaries or any unspecified boundaries. The space can also be, defined in three dimensions.

To this end, the portable tool 100 comprises a processing unit 106 for determining the presence of the portable tool 100 within or outside the pre-determined space 130 comprising:

- means 105 for computing or obtaining (depending on the above-mentioned signaling variant considered) data representing the geo-positioning of the tool 100 on the basis of the geo-positioning information received by the receiver 104;
- means 106 for identifying the position of the tool 100 within or outside the boundaries 131 of the pre-determined space 130 as a function of data representing the location of the tool 100.

Thus, the tool is capable of determining whether it is situated within an authorized zone, i.e. in the pre-determined space 130 representing the right workstation.

In certain cases, several pre-determined spaces can be defined, if necessary with behaviors authorized for the tools that are different according to the space. For example, the tool can be used in two zones of an assembly line, and the operation (torque and/or screw driving sequence for example) can be adapted to the zone considered and therefore to the operation that has to be performed by the tool.

More particularly, depending on the geometry of the pre-determined space 130, 130', its boundaries 131, 131' can be defined by representative data belonging to the group comprising:

- pre-determined point coordinates corresponding to the corners of the boundaries 130;
- theoretical straight line or curved line junctions passing through the corners in question;
- at least one pre-determined borderline distance relative to at least one beacon 110 (or 110' or 110" or 110''').

Besides, the means 106 for identifying the position of the tool 100 integrate a memory 203 in which data are recorded defining the boundaries 131 in question;

As a result, the tool 100 can permanently or periodically, and independently, verify the compliance of its position in the pre-determined space 130 (i.e. the authorized zone) corresponding to the data recorded in the memory.

In order to define the pre-determined space 130, 130' and store the data defining the corresponding boundaries 131, 131', the portable tool 100 can be used according to the example illustrated in at least two modes:

- a learning mode in which the pre-determined space 130, 130' is defined through defining means 106;
- a working mode in which the controller 202 controls the tool 100 according to its geo-positioning situation relative to the pre-determined space 130, 130'.

To this end, the defining means 202 comprise a learning actuator 205 (which may be the trigger for activating the tool in working mode or a button in the case of a module mounted on the tool for which it has not been planned to use the trigger in a learning mode) enabling the indication of the presence of the tool 100 in a corner of the pre-determined space 130, 130' and/or at a distance from a given beacon 110 (or 110' or 110" or 110''').

As a result the operator can, in the learning mode, move along the boundary 131, 131' of the pre-determined space 130, 130' that he wishes to define while actuating the learning actuator 205. Thus the data representing the position at which the tool 100 is situated at the time when the learning actuator 205 is actuated, can be used to define the boundaries 131, 131' of the pre-determined space 130, 130' and store them in the memory 203.

As a variant, the pre-determined space 130, 130' can be configured externally and be transmitted or recorded in the memory 203 of the tool.

Besides, in other variants of signaling between the geo-positioning beacon 110 (or 110' or 110" or 110''') and the tool 100, at least some of these signals exchanged between the geo-positioning beacon 110 (or 110' or 110" or 110''') and the receiver 104 of the portable tool 100 relate to:

- complementary data; and/or
- commands for activating a pre-determined operating strategy; and/or
- operating strategies.

Thus, the use of the capacity of the radio transmission channel between the beacon or beacons of the control system and the tool is optimized.

In the case of data transmitted by the geo-positioning beacon 110 (or 110' or 110" or 110''') (fed by a server 140 or production control system) to the tool 100, such complementary data define for example the activation of a production strategy or screw driving strategy or a strategy for deactivating the screwdriver.

Similarly, in the case of data transmitted by the tool to the geo-positioning beacon 110 (then to the server 140), such complementary data can for example be traceability data (where the tool 100 states that it has correctly screwed the set of planned screws to the motor), an identifier of the operator 120, an identifier of the accessory used etc.

These modes of operation can be used for example if the at least one beacon, the one playing the role of a "master" beacon, is connected to the production control system and thus replaces a fixed external controller or a communications point with the production control system.

In the embodiment illustrated in FIG. 2, receiver 104 for receiving and, if necessary, for sending incorporate means 105 for computing or obtaining (depending on the above-mentioned signaling variant considered) data representing the location of the tool; means 106 for identifying the position of the tool associated with a memory 203 (for example a RAM) are embedded in a module 101 that is to be mounted on the portable tool 100.

This modular aspect enables for example the upgrading of a tool that is not initially designed to support the control technique according to an embodiment of the invention or enables the module 101 to be transferred to another tool in the event of a malfunction.

In other embodiments, not illustrated, the means in question as well as the memory 203 are directly implemented in the tool 100.

Besides, the means in question (means 105 for computing or obtaining data representing the location of the tool, means 106 for identifying the presence of the portable tool 100 within or outside the pre-defined space 130) are implanted for example in the form of a processing unit equipped for example with a processor and managed by a computer program stored in a read-only memory (a ROM or a hard disk drive). At initialization, the code instructions of the computer program are for example loaded into the memory 203 and then executed by the processor of the processing unit.

More particularly, the means in question can equally well be made on a reprogrammable computing machine (a PC computer, a DSP processor or a microcontroller) executing a program comprising a sequence of instructions or a dedicated computation machine (for example a set of logic gates such as an FPGA or an ASIC or any other hardware module). Should the means in question be made with a reprogrammable computation machine, the corresponding program (i.e. the sequence of instructions) can be stored in a storage medium that is detachable (such as for example a flash memory, a USB key, a floppy disk, a CD ROM or a DVD ROM) or not detachable, this storage medium being partially or totally readable by a computer or a processor.

Figure 3:
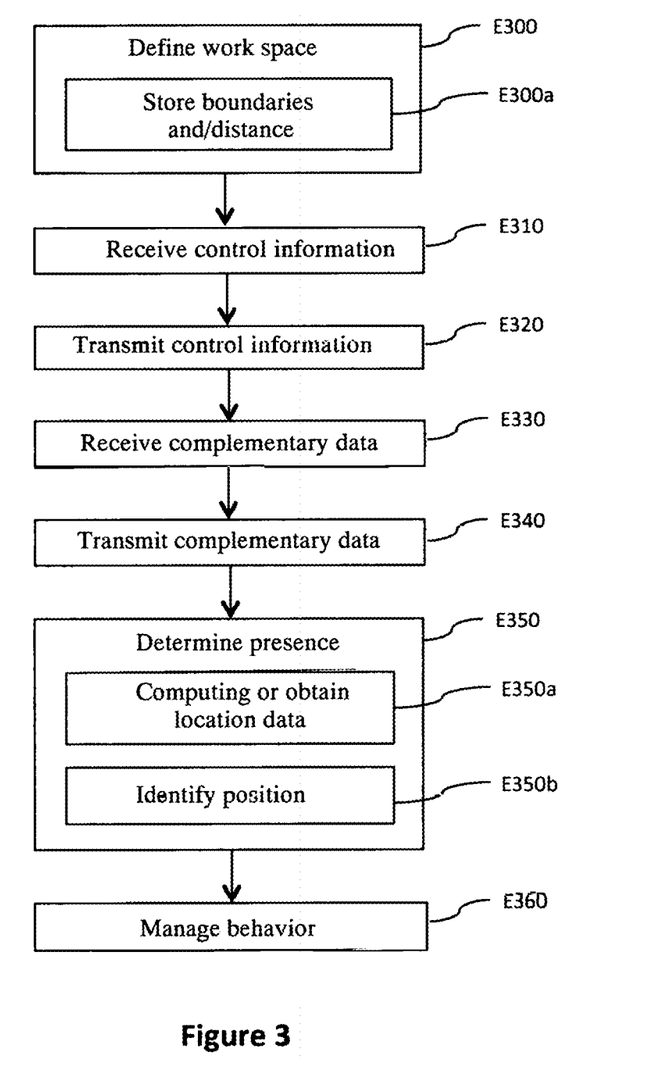
FIG. 3 illustrates steps of a method for controlling the portable tool with autonomous energy source of FIG. 1 according to one embodiment of the invention.

Referring now to FIG. 3, we describe the steps of a method for controlling the portable tool 100 with autonomous energy source of FIGS. 1a, 1b and 2 according to one embodiment of the invention.

First of all, in a learning mode, the tool 100 implements a step E300 for the defining of a pre-determined work space 130, 130', for example by the operator 120 through the implementing of a learning mode in the tool 100 as described here above with reference to FIGS. 1a and 1b.

More particularly, the defining step E300 implements a storage E300a of data representing boundaries 131, 131' of the pre-determined work space and/or a borderline distance relative to the beacon 110 by the activation of the learning actuator 205. These representative data can correspond to a set of points defined by the actuator 205 or, preferably, to a results of computation of boundaries (for example in the form of corners and portions of straight lines and curved lines connecting two corners).

As a result, the tool can, at any time and independently, verify the compliance of its position with the authorized zone corresponding to the data stored in the memory 203.

At a reception step E310, the receiver 104 of the tool 100 receive control information directly delivered by the beacon 110 (or 110' or 110" or 110''').

At a transmission step E320, the receiver 104 of the tool 100 transmit control information to the controller 202 via the SPI link 107. The controller 202 is thus capable of managing the behavior of the tool 100 as a function of the controller and of at least one pre-determined production rule as described here above with reference to FIGS. 1a and 1b.

The information received can especially be raw feedback data from the beacons 110, 110', 110", 110''', on the basis of which the controller 202 determines a position, compares it with boundaries 131, 131' to determine the presence of the tool within or outside the preferred space 130, 130' and manages the tool accordingly in permitting it or not permitting it to operate and, as the case may be, in selecting a specific mode of operation. In one variant, the position is determined by one of the beacons 110 (or 110' or 110" or 110''') (in compiling the data given by several beacons as the case may be) and directly received by the receiver 104.

Besides, at a step E330 for receiving complementary data, the tool 100 receives from the beacon 110 (or 110' or 110" or 110''') for example general data (for example a type of vehicle to be handled, corresponding to a particular mode of operation etc.).

Similarly, at a step E340 for sending complementary data, the tool 100 transmits) for example an identifier of the operator 120 and/or traceability data to the beacon 110 (or 110' or 110" or 110''').

In a step E350 for determining, the tool 100 thus determines whether it is within or outside the pre-determined space 130, 130'.

To this end, the control information comprise geo-positioning information (either raw information coming from the UWB signals used by the geo-positioning beacon to locate the tool or directly the data representing the location of the tool 100 according to the signaling variant, discussed here above with reference to FIGS. 1a and 1b, that is being considered). The tool 100 thus performs:

a step E350a for computing and obtaining (depending on the signaling variant considered) data representing the location of the tool from geo-positioning information received by the receiver 104; and a step E350b for identifying the position of the tool within or outside the boundaries 131, 131' of the pre-determined space 130, 130' as a function of the data representing the location of the tool 100.

During a managing step E360, the controller 202 manages the behavior of the tool 100 as a function of control information and of at least one pre-determined production rule as described here above with reference to FIGS. 1a and 1b.

Although the present disclosure has been described with reference to one or more examples, workers skilled in the art will recognize that changes may be made in form and detail without departing from the scope of the disclosure and/or the appended claims.

The invention claimed is:

1. A system comprising:
   an industrial portable tool comprising an autonomous energy source, the industrial portable tool being a screwdriver or a drill;
   a source of at least one geo-positioning beacon external to the industrial portable tool, capable of communicating with said industrial portable tool; and
   a module configured to be mounted on or in said industrial portable tool, comprising:
      a non-transitory computer-readable memory storing data representing pre-determined boundaries characterizing at least one pre-determined space;
      a receiver configured to receive control information delivered by said at least one geo-positioning beacon external to the industrial portable tool, said control information comprising geo-positioning information;
      a processing unit configured to determine presence of said industrial portable tool within or outside said at least one pre-determined space, from said control information and said pre-determined boundaries; and
   the industrial portable tool further comprising a controller communicating with said receiver and configured to manage behavior of said industrial portable tool as a function of the determined presence of said industrial portable tool within or outside said at least one pre-determined space and at least one pre-determined production rule,
   wherein said at least one pre-determined production rule belongs to a group consisting of the following rules:
      permitting operation of the industrial portable tool and/or one of the industrial portable tool's accessories if the industrial portable tool is situated in at least one pre-determined space;
      preventing the operation of the industrial portable tool and/or one of the industrial portable tool's accessories if the industrial portable tool is not situated in the at least one pre-determined space.

2. A screwdriver comprising:
   an autonomous energy source;
   a module configured to be mounted on or in said screwdriver, comprising:
      a non-transitory computer-readable memory storing data representing pre-determined boundaries characterizing at least one pre-determined space;
      a receiver configured to receive control information delivered by at least one geo-positioning beacon external to the screwdriver, said control information comprising geo-positioning information;

a processing unit configured to determine presence of said screwdriver within or outside said at least one pre-determined space, from said control information and said pre-determined boundaries; and a controller communicating with the receiver and configured to manage behavior of said screwdriver as a function of the determined presence of said screwdriver within or outside said at least one pre-determined space and at least one pre-determined production rule, wherein said at least one pre-determined production rule belongs to a group consisting of the following rules:

permitting operation of the screwdriver and/or one of the screwdriver's accessories if the screwdriver is situated in at least one pre-determined space;

preventing the operation of the screwdriver and/or one of the screwdriver's accessories if the screwdriver is not situated in the at least one pre-determined space.

3. A drill comprising:

an autonomous energy source;

a module configured to be mounted on or in said industrial portable tool, comprising:

a non-transitory computer-readable memory storing data representing pre-determined boundaries characterizing at least one pre-determined space;

a receiver configured to receive control information delivered by at least one geo-positioning beacon external to the industrial portable tool, said control information comprising geo-positioning information;

a processing unit configured to determine presence of said industrial portable tool within or outside said at least one pre-determined space, from said control information and said pre-determined boundaries; and a controller, communicating with said receiver, and configured to manage behavior of said industrial portable tool as a function of the determined presence of said industrial portable tool within or outside said at least one pre-determined space and at least one pre-determined production rule, wherein said at least one pre-determined production rule belongs to a group consisting of the following rules:

permitting operation of the industrial portable tool and/or one of the industrial portable tool's accessories if the industrial portable tool is situated in at least one pre-determined space;

preventing the operation of the industrial portable tool and/or one of industrial portable tool's accessories if the industrial portable tool is not situated in the at least one pre-determined space.

4. An industrial portable tool module configured to be mounted on or in an industrial portable tool having an autonomous energy source, the industrial portable tool module being a screwdriver or a drill module, the industrial portable tool module comprising:

a non-transitory computer-readable memory storing data representing pre-determined boundaries characterizing at least one pre-determined space;

a receiver configured to receive control information delivered by at least one geo-positioning beacon external to the industrial portable tool, said control information comprising geo-positioning information;

a processing unit configured to determine presence of said industrial portable tool within or outside said at least one pre-determined space, from said control information and said pre-determined boundaries; and a controller communicating with the receiver and configured to manage behavior of said industrial portable tool as a function of the determined presence of said industrial portable tool within or outside said at least one pre-determined space and at least one pre-determined production rule, wherein said at least one pre-determined production rule belongs to a group consisting of the following rules:

permitting operation of the industrial portable tool and/or one of the industrial portable tool's accessories if the industrial portable tool is situated in at least one pre-determined space;

preventing the operation of the industrial portable tool and/or one of the industrial portable tool's accessories if the industrial portable tool is not situated in the at least one pre-determined space.

5. The portable tool module according to claim 4, wherein said geo-positioning information comprises data representing the location of the industrial portable tool.

6. The industrial portable tool module according to claim 5, wherein said processing unit is configured to compute or obtain data representing a location of said industrial portable tool from the received control information, wherein said data representing location belong to a group consisting of:

at least one distance between said industrial portable tool and said at least one geo-positioning beacon;

coordinates of said industrial portable tool in a fixed reference system, obtained by a computation of trilateration on the basis of distances between the industrial portable tool and at least two geo-positioning beacons;

polar coordinates of the industrial portable tool relative to a fixed reference point of said at least one geo-positioning beacon;

polar coordinates of at least two geo-positioning beacons relative to the fixed reference point of said industrial portable tool.

7. The industrial portable tool module according to claim 4, wherein said receiver communicates with said controller in said industrial portable tool according to one of the techniques belonging to a group consisting of:

an SPI link;

an I2C link;

a USB link;

an asynchronous serial link;

at least one digital input/output;

radio.

8. The industrial portable tool module according to claim 4, wherein the receiver is configured to receive the at least one geo-positioning beacon by implementing Ultra-Wide Band radio communications on a frequency band ranging from 3 to 10 GH.

9. The industrial portable tool module according to claim 4, wherein said pre-determined boundaries of said at least one pre-determined space are defined by data representing boundaries belonging to a group consisting of:

pre-determined point coordinates corresponding to corners of said pre-determined boundaries;

theoretical straight-line or curved-line junctions passing through said corners;

at least one pre-determined borderline distance relative to at least one pre-determined beacon of the at least one geo-positioning beacon.

10. The industrial portable tool module according to claim 4, wherein at least one signal received by said receiver from at least one of the at least one geo-positioning beacon relates to:

complementary data; and/or commands for activating a pre-determined operation strategy and/or deactivating said industrial portable tool and/or one of its accessories.

11. The industrial portable tool module according to claim 4, wherein said processing unit is further configured to:
compute or obtain said data representing a location of said industrial portable tool on the basis of said geo-positioning information received by said receiver;
identify the presence of said industrial portable tool within or outside the pre-determined boundaries of said at least one pre-determined space as a function of said data representing the location of said industrial portable tool.

12. The industrial portable tool module according to claim 4, said processing unit defining said at least one pre-determined space in a learning mode.

13. The industrial portable tool module according to claim 12, comprising a learning actuator enabling indication of the presence of said industrial portable tool in a corner and/or at a boundary of said at least one pre-determined space and/or at a reference distance from at least one of said geo-positioning beacons.

14. The industrial portable tool module according to claim 4, wherein said industrial portable tool further comprises a learning actuator enabling indication of the presence of said industrial portable tool in a corner of said at least one pre-determined space and/or at a distance from said at least one geo-positioning beacon.

15. A method for controlling an industrial portable tool having an autonomous energy source, the industrial portable tool being a screwdriver or a drill, and the method implementing the following acts in said industrial portable tool:
storing data representing pre-determined boundaries characterizing at least one pre-determined space in a non-transitory computer-readable medium of the industrial portable tool;
receiving control information, by a receiver of the industrial portable tool, which is delivered by at least one geo-positioning beacon external to said industrial portable tool, communicating with said industrial portable tool, said control information comprising geo-positioning information;
a processing unit of the industrial portable tool determining presence of said industrial portable tool within or outside said at least one pre-determined space from said control information and said pre-determined boundaries; and
a controller of the industrial portable tool communicating with the receiver and managing behavior of said industrial portable tool as a function of the determined presence of said industrial portable tool within or outside said at least one pre-determined space and at least one pre-determined production rule, wherein said at least one pre-determined production rule belongs to a group consisting of the following rules:
permitting operation of the industrial portable tool and/or one of the industrial portable tool's accessories if the industrial portable tool is situated in at least one pre-determined space;
preventing the operation of the industrial portable tool and/or one of the industrial portable tool's accessories if the industrial portable tool is not situated in the at least one pre-determined space.

16. The method according to claim 15, wherein said determining comprises:
computing or obtaining said data representing a location of said industrial portable tool on the basis of said geo-positioning information received by the receiver of the industrial portable tool;
identifying the presence of the industrial portable tool within or outside the pre-determined boundaries of said at least one pre-determined space as a function of the data representing the location of said industrial portable tool.

17. The method according to claim 15, further comprising implementing, in said industrial portable tool, in a learning mode, an act of defining said at least one pre-determined space.

18. The method according to claim 17, wherein said act of defining implements the act of storing the data representing the pre-determined boundaries of said at least one pre-determined space and/or a borderline distance relative to a pre-determined one of the at least one geo-positioning beacons by activation of a learning actuator.

19. The method according to claim 15, comprising a receiving complementary data in said industrial portable tool and/or transmitting complementary data from said industrial portable tool to a server via signals exchanged with said at least one geo-positioning beacon.

* * * * *